(12) United States Patent
Hancock et al.

(10) Patent No.: US 6,902,087 B2
(45) Date of Patent: Jun. 7, 2005

(54) ALL TERRAIN VEHICLE SLOPED BAG WITH PROTECTED ZIPPERS

(75) Inventors: Dennis H. Hancock, Mountain Green, UT (US); Jeffery D. Hancock, Uintah, UT (US)

(73) Assignee: Stearns Inc., Sauk Rapids, MN (US)

(*) Notice: Subject to any disclaimer, the term of this patent is extended or adjusted under 35 U.S.C. 154(b) by 0 days.

(21) Appl. No.: 10/094,858

(22) Filed: Mar. 12, 2002

(65) Prior Publication Data

US 2003/0183668 A1 Oct. 2, 2003

(51) Int. Cl.[7] .............................. B60R 7/00; B60R 9/00; B62J 7/00; B62J 9/00; B62J 11/00
(52) U.S. Cl. ..................... 224/401; 224/437; 224/439; 224/572; 190/902; 190/903; 383/61.3
(58) Field of Search ................................ 224/237, 401, 224/437, 439, 572; 190/902, 903; 383/61.3, 97, 99, 98; D3/268, 289, 301

(56) References Cited

U.S. PATENT DOCUMENTS

| | | | | |
|---|---|---|---|---|
| 199,067 A | * | 1/1878 | Hoff | 224/199 |
| 501,821 A | * | 7/1893 | Browne | 224/582 |
| 864,282 A | * | 8/1907 | Altmyer | 224/483 |
| 1,753,813 A | * | 4/1930 | Washburn | 383/21 |
| 2,289,254 A | * | 7/1942 | Eagles | 383/97 |
| 4,258,869 A | * | 3/1981 | Hilgendorff | 224/429 |
| D265,696 S | * | 8/1982 | Koszegi | D3/268 |
| D268,879 S | * | 5/1983 | Outcalt | D3/268 |
| D289,106 S | * | 4/1987 | Leiserson | D3/268 |
| 4,693,344 A | * | 9/1987 | Shuler | 190/107 |
| 4,724,791 A | * | 2/1988 | McSorley | 114/343 |
| 4,802,233 A | * | 1/1989 | Skamser | 383/15 |
| 4,842,032 A | * | 6/1989 | Mastronardo | 206/308.1 |
| D329,957 S | * | 10/1992 | Hartnett | D6/601 |
| 5,160,001 A | * | 11/1992 | Marceau | 190/102 |
| 5,297,870 A | * | 3/1994 | Weldon | 383/59 |
| 5,538,169 A | * | 7/1996 | Moore | 224/328 |
| 5,660,476 A | * | 8/1997 | DeCoster | 383/29 |
| 5,738,262 A | * | 4/1998 | Andrini | 224/572 |
| 5,868,219 A | * | 2/1999 | Sadeck et al. | 182/70 |
| 5,868,295 A | * | 2/1999 | Carriere | 224/404 |
| 5,890,639 A | * | 4/1999 | Hancock et al. | 224/429 |
| 6,547,113 B1 | * | 4/2003 | Hancock et al. | 224/408 |

FOREIGN PATENT DOCUMENTS

JP             406099995 A   *   4/1994   .................. 383/97

* cited by examiner

*Primary Examiner*—Sue A. Weaver
(74) *Attorney, Agent, or Firm*—Merchant & Gould P.C.

(57) ABSTRACT

A carry bag for all-terrain vehicles having a top cover with paired zippers that open and close simultaneously during opening or closing of the top cover and that are protected by a sloped protection cover that releasably covers the top cover and the zippers.

6 Claims, 3 Drawing Sheets

ALL TERRAIN VEHICLE SLOPED BAG WITH PROTECTED ZIPPERS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to carry bags for use with all terrain vehicles and is intended to provide effective protection for articles placed in bags that are removably attached to the rear racks of such vehicles.

Various carry bags have been proposed in the past for holding articles on the racks of all terrain vehicles. Because of the manner in which said vehicles are used it is very important that bags used must provide maximum protection against the entrance of dust and moisture into the bag interiors. Usually, the bags used in the past have included front, back, sides and end walls covered by a flap that is buckled or otherwise secured in a closed position and that is released and pivoted to an open position to allow access to the interior of the bag. Alternatively, the usual bags may include a zipper that is curved around the front and end walls adjacent a top opening of the bag and that secures a top cover of the bag to a bag body. Access to the interior of the alternate bag is achieved by unzipping the top from the front and end walls and lifting the top cover.

It has been found that with bags as heretofore described dust and moisture gets into the bags and the contents of the bags can be damaged. Furthermore, the zippers turning corners to extend around the top edge of the bag opening often stick, break and fail at the corners turned by the zippers if the zippers are not protected against the introduction of dust and water.

BRIEF SUMMARY OF THE INVENTION

Principal objects of the present invention are to provide a bag that is suitable for mounting on the racks of all terrain vehicles and that will include protected zippers not subject to sticking, breaking or failing at zipper corners.

Other objects are to provide a bag with a protection cover for zippers used to provide access to the interior of the bag and with the protection cover sloped to shed moisture that would otherwise collect on the cover.

Principal features of the invention include a bag having a top cover with a pair of spaced apart, parallel extending, straight zippers in the top cover. A top flap formed between the zippers is raised when the zippers are unzipped to allow access to the interior of the bag. A flexible tether connects the zipper runners if the parallel zippers and is used to simultaneously zip or unzip the parallel zippers.

A sloped protection cover extends over the top cover of the bag and over the parallel zippers. The sloped protection cover protects the zippers from the introduction of dust and moisture and allows moisture that would otherwise collect on the cover to fall down the sloped surface and off the bag.

The bag of the invention can obviously be made in different sizes, and with the parallel zippers extending length wise or width wise on the top cover of the bag. Also, a plurality of bags may be connected back to back to make a composite bag, if desired.

Additional objects and features of the invention will become apparent to those skilled in the art to which the invention pertains from the following detailed description and drawings.

BRIEF DESCRIPTION OF THE SEVERAL VIEWS OF THE DRAWINGS

FIG. Is a perspective view of a composite bag of the invention mounted on a rack of an all-terrain vehicle.

FIG, 2, a perspective view of the bag of FIG. 1, with the protection cover of the large bag partially opened.

DETAILED DESCRIPTION OF THE INVENTION

Figure 1:
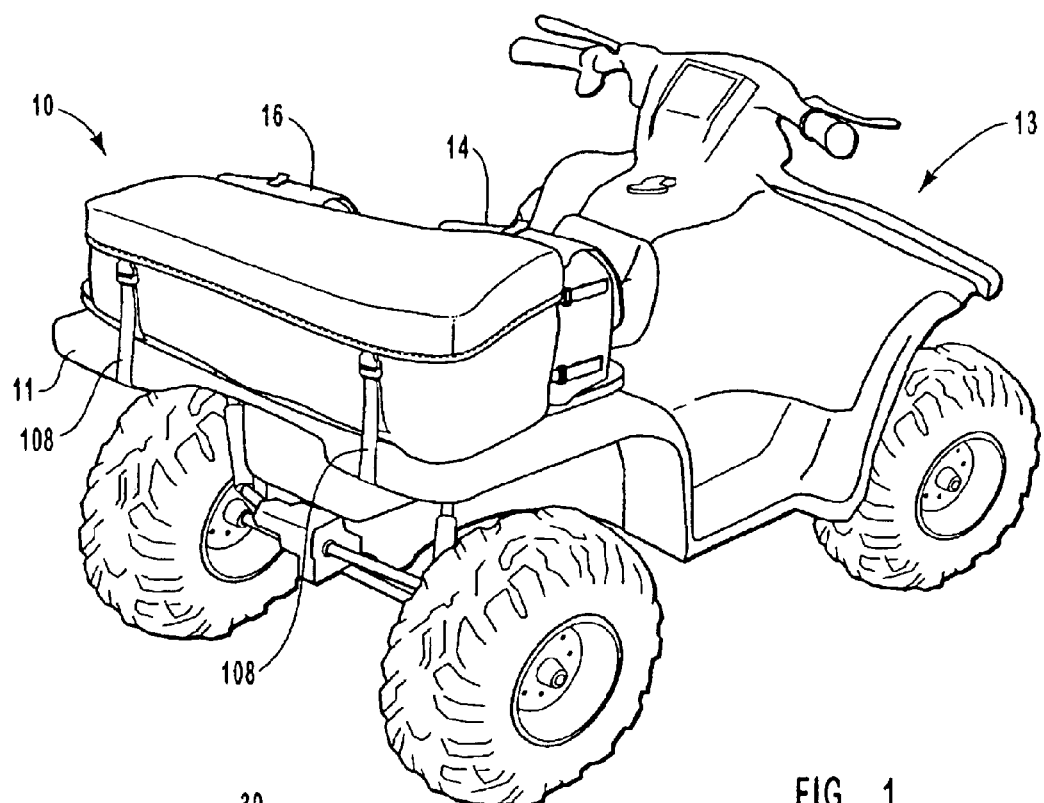
Figure 2:
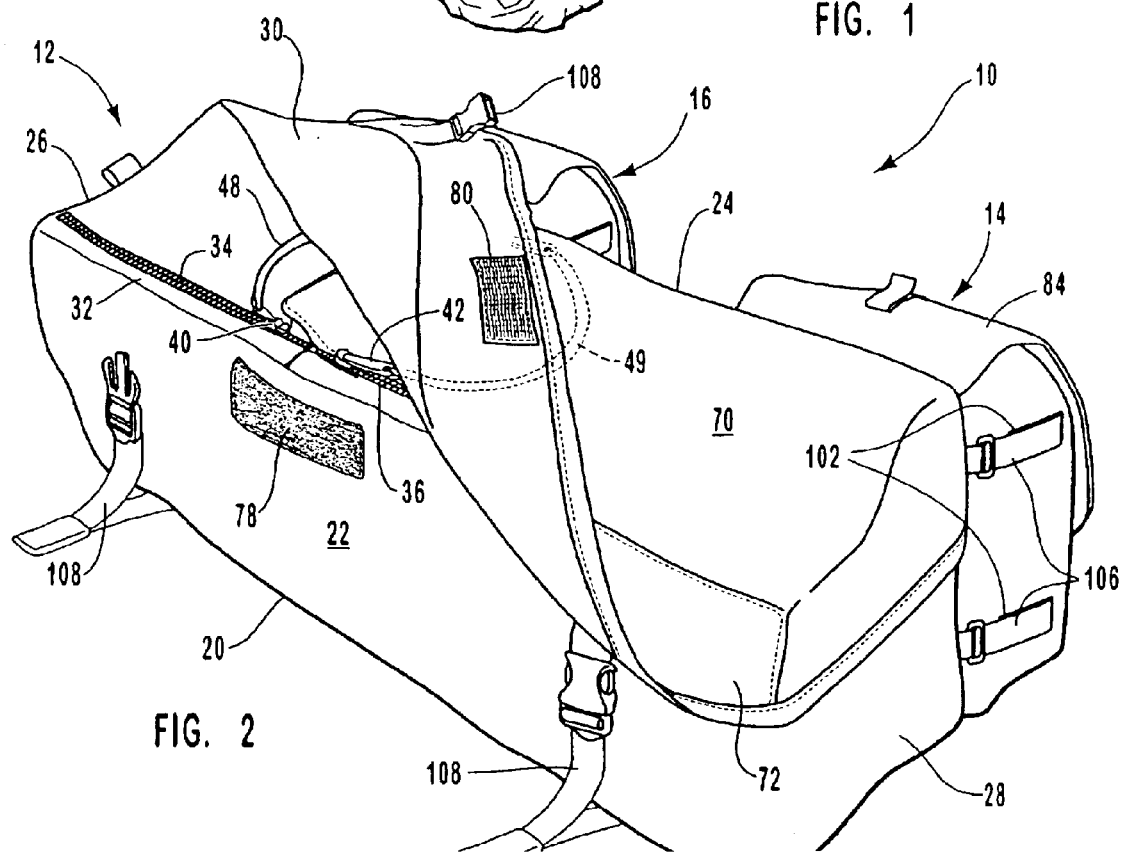
Figure 3:
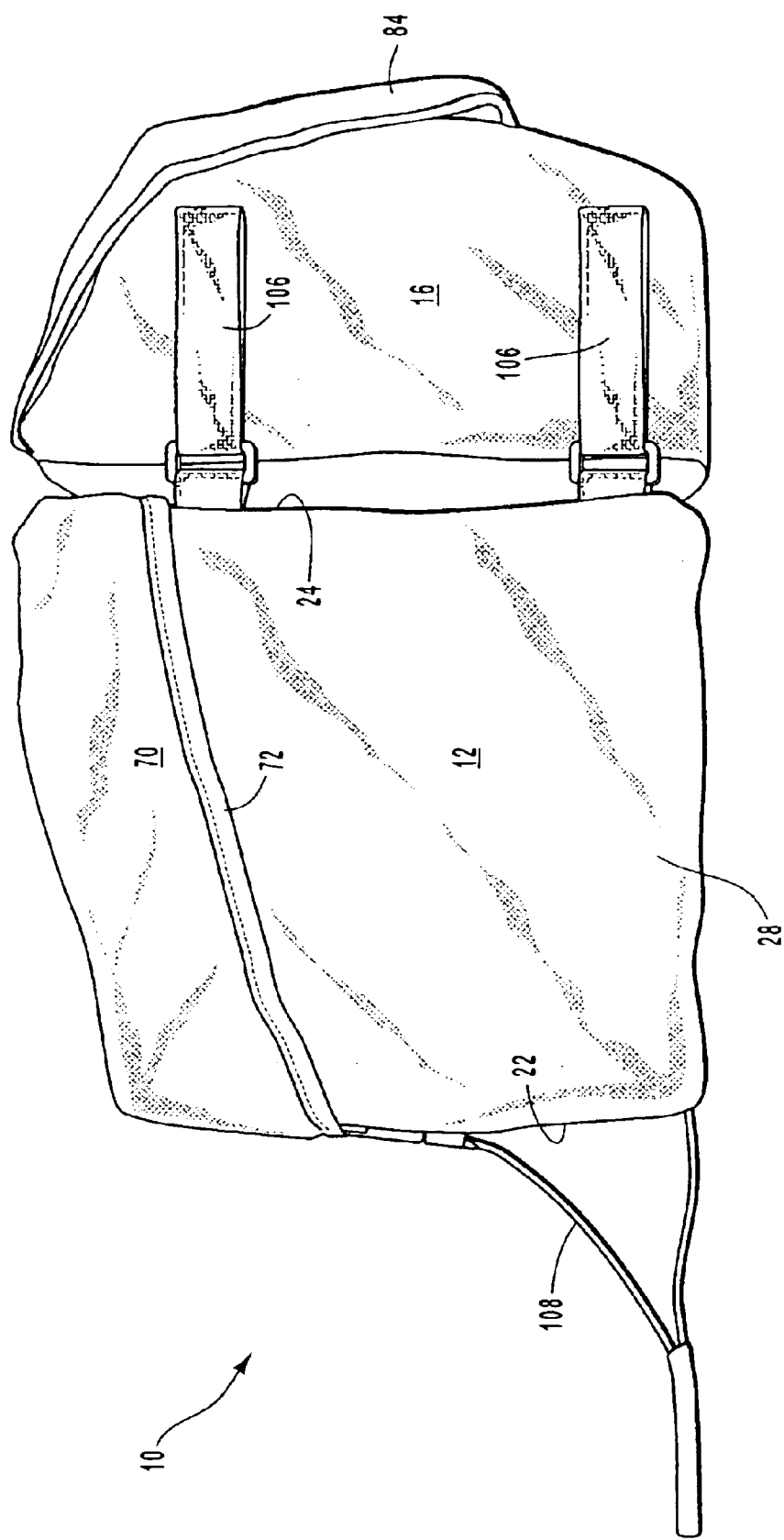
FIG. 3, a end elevation view.
Figure 4:
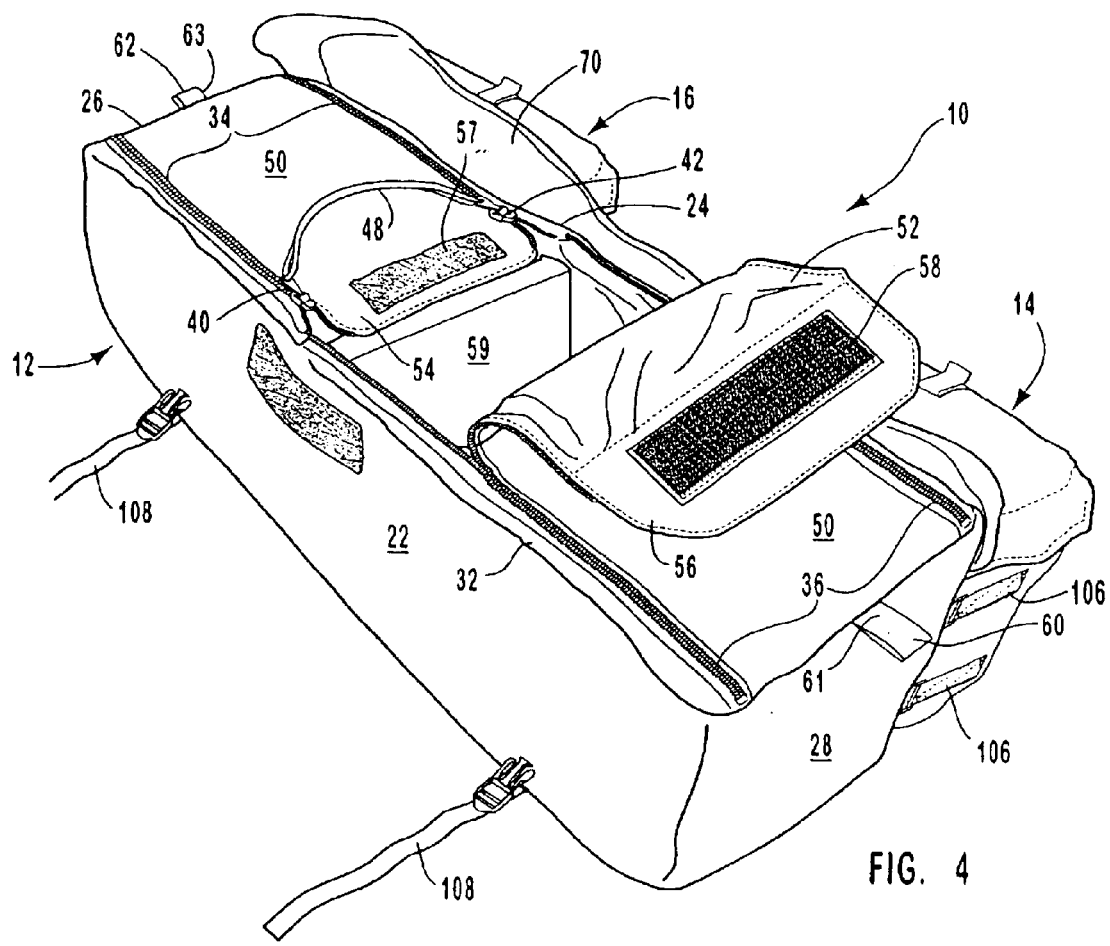
FIG. 4, a perspective view, with the protection cover fully opened and a top flap partially open.
Figure 5:
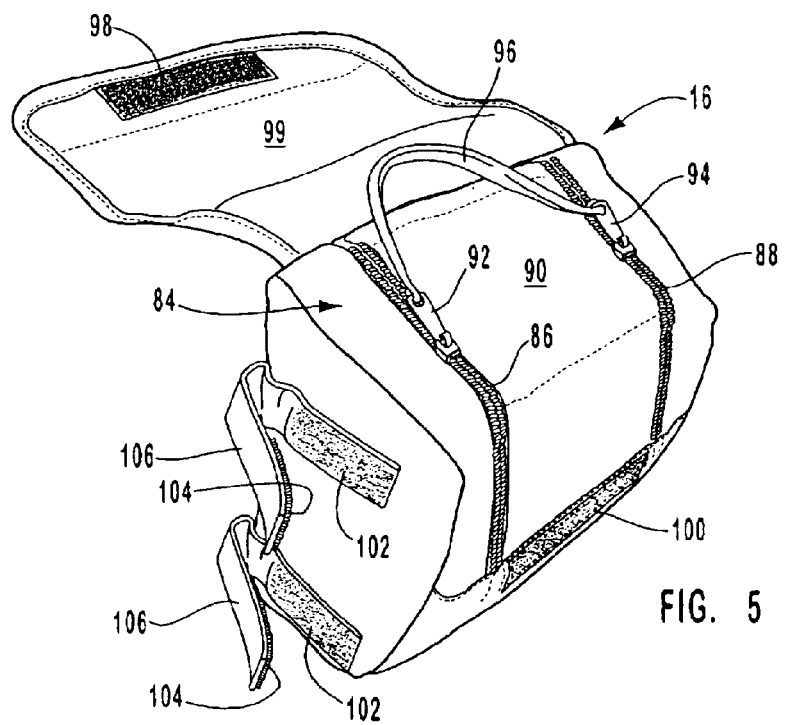
FIG. 5, a perspective view of a small bag of the invention, with the protection cover fully opened.

Referring now to the drawings:

In the illustrated preferred embodiment of the invention, a composite bag is shown generally at 10, mounted on a rear rack 11 of an all terrain vehicle 13. Composite bag 10 includes a large bag 12 and a pair of smaller bags 14 and 16.

Bag 10 includes a bottom 20 that interconnects spaced apart front and rear walls 22 and 24 and spaced apart end walls 26 and 28. The front and rear walls 22 and 24 and end walls 26 and 28 are made of a semi-rigid material, such as plastic that will maintain or return to their assigned shapes and the bottom and front and rear walls are covered with a suitable water resistant fabric material 30. A top cover 32 extends over an open top formed by the front, rear and end walls. The flexible top cover 32 is preferably formed from the same water resistant fabric material covering the bottom and front, rear and end walls.

Spaced apart pairs of parallel zippers 34 and 36 are sewn into the top cover 32 and each pair extend from an end wall 26 or 28 to the center of the top cover. The pairs of zippers 34 and 36, respectively, have zipper runners 40 and 42. The parallel zippers 34 are spaced such that each is closely position to be adjacent to a front or rear wall 22 or 24 and the zipper runners 40 are interconnected by a flexible tether 48. Parallel zippers 36 are also sewn into top cover 32, with each zipper adjacent to the front wall 22 or to the rear wall 24. A flexible tether 49 interconnects the zipper runners 42. The zippers are sewn to the top cover 32 with the portion of the top cover between the pairs of zippers forming a pair of cooperating top flaps 50 and 52. The top flaps 50 and 52 extend from adjacent to opposed end walls and have respective ends 54 and 56 that overlap. Ends 54 and 56 have cooperating "VELCRO" elements 57 and 58, respectively, thereon to interlock when the ends of the top flaps are overlapped. A divider wall 59 may be provided in the interior of bag 14. Divider wall 59 stretches between the front wall 22 and the rear wall to wall 24 and from the bottom 30 to just beneath the top cover 32 and provides backing for the "VELCRO" elements 57 and 58 as the elements are interlocked. A hold tab 60 has one end 61 fixed to the material 30 covering the end wall 28 adjacent to ends of zippers 34. A similar tab 62 has one end 63 fixed to fabric 30 covering end wall 26, adjacent to ends of the zippers 36.

In practice, a user will grasp a hold tab 60 or 62 with one hand and a tether 48 or 49 with the other hand. The tether and the zipper runners 40 or 42 attached thereto are pulled to close the zippers. With the zippers closed top flaps 50 and 52 are closed to protect the contents of bag 12 and to hold contents in the bag. To open the zippers a tab 60 or 62 is grasped and tether 48 or 49 is pulled to open the zippers and to release top flaps 50 and 52 to be lifted and to allow access to the interior of bag 12, as defined by the bottom and the front and rear walls and the end walls.

To further protect the interior of bag 12 against introduction of dust and water that may be introduced through flaps 50 and 52 and through zippers and to protect the zippers from being fouled by water and dust a protection cover 70 is provided to overlie the top cover. Protection cover 70 is preferably made from the same water resistant fabric 30 and extends outwardly from the rear wall 24 to a lip 72 that fits snugly around the end walls 26 and 28 and the front wall 22. The top ends of the end walls 26 and 28 are each sloped downwardly from a connection to the rear wall 24 at a location above the tops of flaps 50 and 52 to a connection with the front wall 22. Rear wall 24 extends upwardly beyond the top cover 50 so that when the protection cover 70 is secured in place overlying the top cover 50 and with the lip 72 closely surrounding the end walls 26 and 28 the protection cover slopes from the rear wall 24 to the front wall 22. With the protection cover sloped, as described, some dust and water otherwise collecting on the protection cover 70 will fall from the cover. The protection cover 70 protects the top cover 50 and 52 and the zippers 44 and 46 from dust and water.

The protection cover 70 is releasably secured to the fabric 30 of front wall 22 by cooperating "VELCRO" strips 78 on the front wall 22 and 80 on the protection cover.

Smaller bags 14 and 16 are identical in their construction. Bags 14 and 16 are the same as bag 12, except smaller, and different in the construction of the front wall, top cover, the arrangement of zippers in the top cover and the provision of a single flap between zippers. In this embodiment, the top cover, shown generally at 84 has a pair of zippers 86 and 88 with an access flap 90 between the zippers. The zippers extend from the back wall to the front wall and down the front wall to adjacent the bottom of bag 14. Zipper runners 92 and 94 of the zippers 86 and 88, respectively, are pulled by a flexible tether 96 towards the rear wall to close the top cover, to protect contents of the bag 14 and to hold such contents in the bag. Pulling of the tether away from the rear wall to open the zippers will allow the access flap 90, formed between the parallel zippers, to be raised for access to the interior of the bag.

A flexible, water resistant, protection cover 97 extends from the upper end of the rear wall of the bag over the top cover 84 and the front wall of the bag and is releasably secured to the front wall with cooperating "VELCRO" strips 98 and 100, respectively, attached to the protection cover and the front wall of bag 14.

Small bags 14 and 16 are releasably secured to the large bag 12 by cooperating "VELCRO" strips 102, fastened to the small bags and strips 104, respectively fastened to the large bag 12 and by connector straps 106 secured to the small and large bags.

Connector straps 108, attached to the large bag 12 are used to secure the composite bag 10 or the large bag 12 to the rack 11 of all terrain vehicle 13.

Although a presently preferred embodiment of our invention has been herein disclosed, it is to be understood that the present disclosure is by way of example and that variations are possible without departing form the scope of the following claims, which subject matter we regard as our invention.

We claim:

1. A carry bag for attachment to a rack of an all-terrain vehicle comprising a bag housing including a bottom connecting spaced apart front and rear walls with said rear wall extending from said bottom further than said front wall and a pair of spaced apart end walls connected to said front and rear walls to provide a bag interior within said bottom, front and rear walls and said end walls;

a top cover interconnecting said front and rear walls and said end walls at a top edge of said front wall;

at least one pair of parallel extending zippers in said top cover; and a protection cover fixed to said rear wall and extending over said top cover and said front, rear and end walls and releasably secured to said front wall, whereby the surface of said protection cover is sloped downwardly from said rear wall to said front wall.

2. A carry bag as in claim 1, wherein runners of said zippers are interconnected by a flexible tether, whereby pulling on said tether moves said runners simultaneously.

3. A carry bag as in claim 2, wherein the zippers extend lengthwise between said end walls.

4. A early bag as in claim 3, wherein the zippers extend from the rear wall to the front wall.

5. A carry bag for attachment to a rack of an all-terrain vehicle comprising a bag housing including a bottom connecting spaced apart front and rear walls with said rear wall extending from said bottom further than said front wall and a pair of spaced apart end walls connected to said front and rear walls to provide a bag interior within said bottom, front and rear walls and said end walls;

a top cover interconnecting said front and rear walls and said end walls at a top edge of said front wall;

two pair of parallel extending zippers in said top cover;

said zippers extending lengthwise between said end walls with each pair extending from an end wall towards the other pair and runners of said zippers being interconnected by a flexible tether, whereby pulling on said tether moves said runners simultaneously;

a top flap in said top cover between each pair of zippers, said top flaps have ends overlapping one another and means releasably interlocking said overlapping ends of said top flaps; and a protection cover fixed to said rear wall and extending over said top cover and said front, rear and end walls and releasably secured to said front wall, whereby the surface of said protection cover is sloped downwardly from said rear wall to said front wail.

6. A carry bag as in claim 5, further including a divider wall in the bag extending between the front wall, the rear wall and from the bottom to beneath overlapping ends of said top flaps and provides backing for the means releasably interlocking said overlapping ends of the top flaps.

* * * * *